June 12, 1928.
E. S. ENGLE ET AL
1,673,502
CLOTH CUTTING AND BUTTON REMOVING MACHINE
Filed Jan. 18, 1928
2 Sheets-Sheet 1
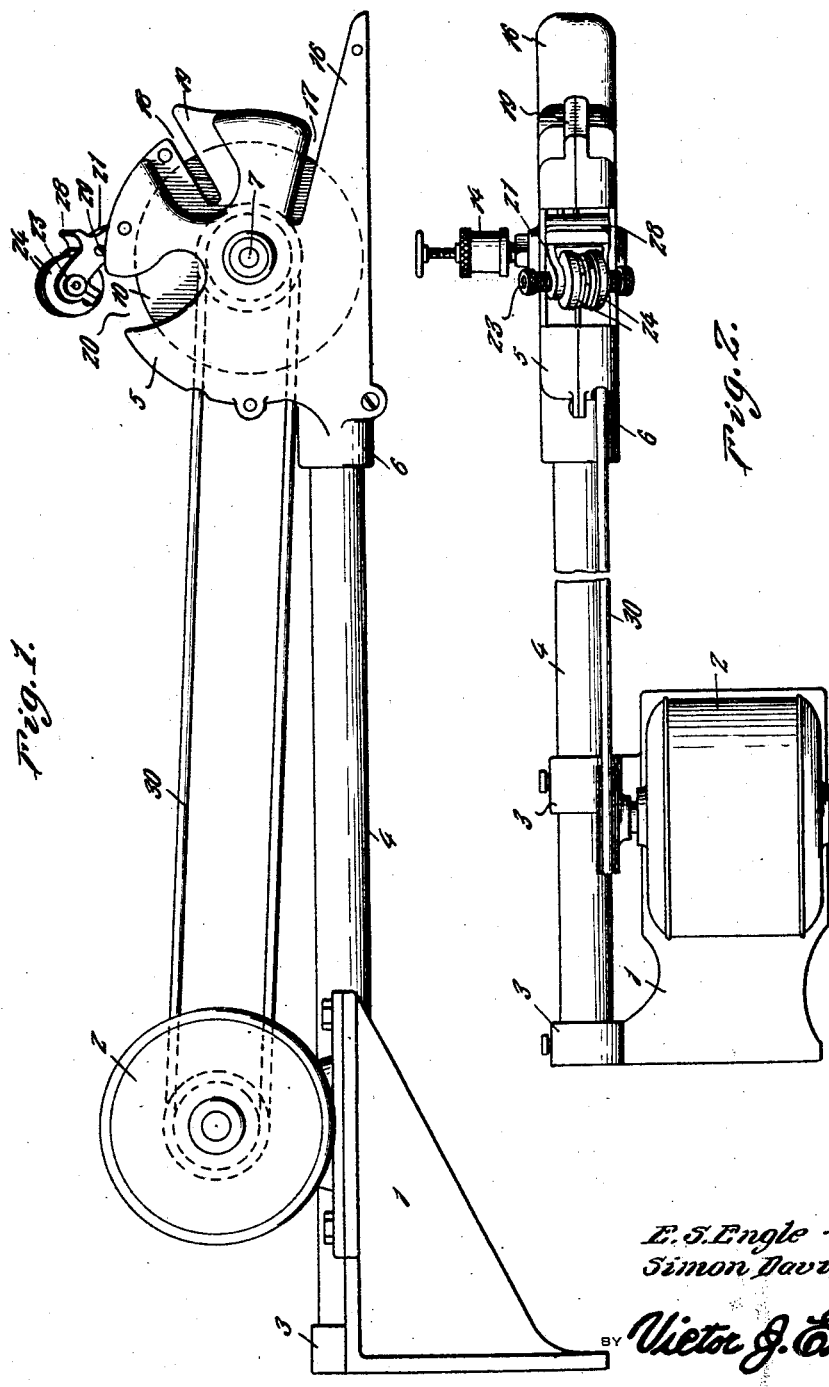
E. S. Engle
Simon Davis
INVENTORS
BY Victor J. Evans
ATTORNEY June 12, 1928.
E. S. ENGLE ET AL
1,673,502
CLOTH CUTTING AND BUTTON REMOVING MACHINE
Filed Jan. 18, 1928  2 Sheets-Sheet 2
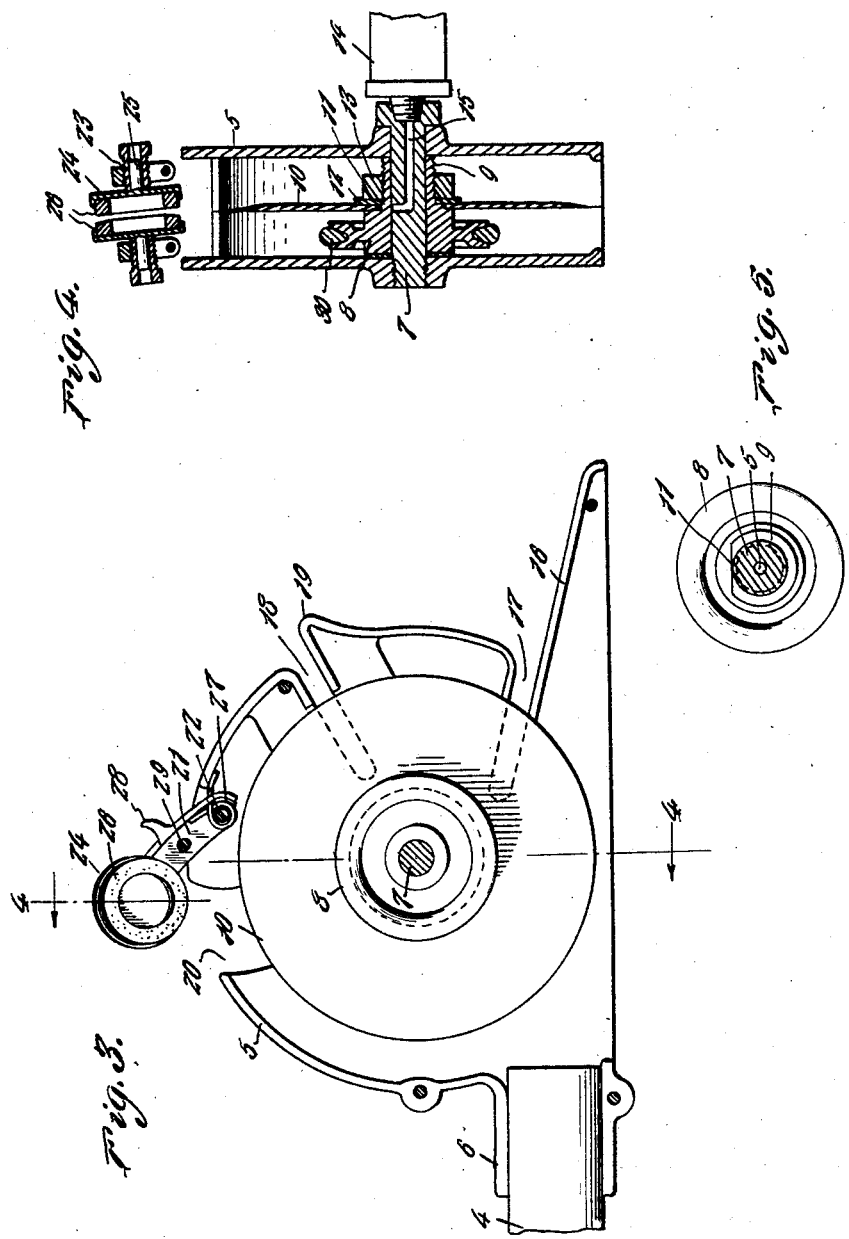
E. S. Engle
Simon Davis
INVENTORS
BY Victor J. Evans
ATTORNEY

Patented June 12, 1928.

UNITED STATES PATENT OFFICE.

EDGAR S. ENGLE AND SIMON DAVIS, OF GREENSBURG, PENNSYLVANIA.

CLOTH-CUTTING AND BUTTON-REMOVING MACHINE.

Application filed January 18, 1928. Serial No. 247,654.

This invention relates to a cloth cutting device, the general object of the invention being to provide means whereby old garments, rags and the like can be cut into pieces very quickly and easily and without danger of the operator injuring himself.

Another object of the invention is to provide means whereby buttons, buckles, hooks and the like can be cut from the garments or cloth by the cutting disk of the device without removing much of the cloth with the buttons or other articles removed from the garment.

A still further object of the invention is to provide means whereby the cutting disk can be sharpened without removing it from its casing.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a side elevation of the invention.

Figure 2 is a plan view thereof.

Figure 3 is a side view of the cutter part of the device, with half of the casing removed.

Figure 4 is a section on line 4—4 of Figure 3.

Figure 5 is a view of the pulley, showing the flat portion of its hub which causes the cutter disk to move with the pulley.

In these views, the numeral 1 indicates a bracket which is adapted to be fastened to any suitable support and 2 indicates an electric motor supported by the bracket. The bracket is provided with the circular parts 3 at one side thereof and 4 indicates a tubular arm which has its inner end placed in said parts 3 and clamped therein by set screws or the like.

A casing 5 is provided with a tubular part 6 at its lower end which receives the outer end of the arm 4, said arm being held in said tubular part by a set screw or the like. This casing is formed with two halves, bolted or otherwise fastened together, and a shaft 7 passes through the center of the casing and is suitably connected therewith, for instance, by having a head on one end engaging a boss on one-half of the casing and having its other end threaded to engage a threaded boss on the other half of the casing. A pulley 8 is rotatably mounted on the shaft 7 and has a threaded hub 9.

The cutter disk is shown at 10, and said disk has a central opening therein provided with a flat part which rests against a flat shoulder 11 formed on the hub of the pulley when the hub is passed through the opening in the disk. Thus the disk is prevented from rotating on the hub of the pulley. A washer 12 and a nut 13 hold the disk in position on the hub of the pulley, the nut engaging the threaded part of the hub. A grease cup 14 is connected with the headed part of the shaft and said shaft is provided with a passage 15 for leading the lubricant from the grease cup to the internal surface of the hub of the pulley so that the parts will be lubricated.

The lower front portion of the casing is shaped to form a horn 16 and immediately above the horn, the casing is slotted, as at 17, so that material placed on the horn and moved upwardly into the slot will be engaged by the cutting edge of the disk so that material will be severed by simply drawing it up the horn into the slot, the hands of the operator passing to the sides of the casing. The casing is also provided with a slot 18 in its upper front part and the walls of the casing adjacent the slot are pressed inwardly so that said walls lie close to the disk, as shown at 19. This will enable portions of the material carrying buttons, hooks, buckles or the like to be placed in the slot 18 and pressed against the cutter so that the said buttons, etc. can be cut from the material without removing but little of the material. A large slot 20 is formed in the top part of the casing adjacent the rear thereof and a pair of arms 21 is pivoted to the two sides of the casing adjacent said slot by the bolt 22. The outer end of each arm is formed with a threaded hole for receiving the threaded bushing 23. A flanged disk 24 has its stem 25 entering each bushing and a ring-shaped piece of abrasive material, shown at 26, is carried by each disk 24. Thus by turning the bushings, the abrasive rings can be moved toward or away from each other and said rings are fastened in the flanged disks by adhesive material or the like. As shown, the two arms 21 are angularly arranged so that the rings set at an incline to the disk 10 and thus said rings will sharpen both edges of the disk when the arms are depressed to force the rings against the beveled edge of the disk.

A spring 27 is arranged on the bolt 22 and tends to hold the arms 21 with the sharpening rings in raised position. A projection 28 is carried by each arm so that pressure against this projection will force the rings against the disk. The two arms are bolted together intermediate their ends by a bolt 29 so that they will move in unison, but by removing this bolt one arm can be lowered while the other is in raised position so as to permit replacement of the abrasive rings whenever necessary.

A belt 30 connects a pulley on the motor shaft with the pulley 8 so that the device is operated from the motor.

From the foregoing it will be seen that we have provided efficient and safe means whereby an operator can easily and quickly cut garments, rags and the like into pieces and can also remove buttons, hooks, buckles and the like from garments. It will also be seen that the cutter disk can be sharpened when required by simply pressing the sharpening device downwardly to bring the abrasive rings against the disk.

It is thought from the foregoing description that the advantages and novel features of our invention will be readily apparent.

It is to be understood that we may make changes in the construction and in the combination and arrangement of the several parts, provided that such changes fall within the scope of the appended claim.

What we claim is:—

A device of the class described comprising a casing, a cutting disk rotatably mounted therein, means for rotating the disk, said casing having slots therein for permitting material to be brought against the disk, a horn formed on the casing for guiding the material into one slot, the parts of the casing adjacent the other slot being pressed inwardly close to the disk to permit buttons and the like to be removed from the material.

In testimony whereof we affix our signatures.

EDGAR S. ENGLE.
SIMON DAVIS.